US009613299B2

(12) United States Patent
Krivosheev et al.

(10) Patent No.: US 9,613,299 B2
(45) Date of Patent: Apr. 4, 2017

(54) METHOD OF IDENTIFYING PATTERN TRAINING NEED DURING VERIFICATION OF RECOGNIZED TEXT

(71) Applicant: ABBYY Development LLC, Moscow (RU)

(72) Inventors: Michael Krivosheev, Moscow (RU); Natalia Kolodkina, Moscow (RU); Alexander Makushev, Balashikha (RU)

(73) Assignee: ABBYY Development LLC (RU)

( * ) Notice: Subject to any disclaimer, the term of this patent is extended or adjusted under 35 U.S.C. 154(b) by 103 days.

(21) Appl. No.: 14/567,548

(22) Filed: Dec. 11, 2014

(65) Prior Publication Data

US 2015/0206033 A1 Jul. 23, 2015

(30) Foreign Application Priority Data

Jan. 21, 2014 (RU) .................. 2014101663

(51) Int. Cl.
*G06K 9/62* (2006.01)
*G06K 9/03* (2006.01)
*G06K 9/00* (2006.01)

(52) U.S. Cl.
CPC ....... *G06K 9/6263* (2013.01); *G06K 9/00456* (2013.01); *G06K 9/033* (2013.01); *G06K 9/6272* (2013.01); *G06K 2209/01* (2013.01)

(58) Field of Classification Search
None
See application file for complete search history.

(56) References Cited

U.S. PATENT DOCUMENTS

| 6,028,970 A * | 2/2000 | DiPiazza | G06K 9/03 382/229 |
| 8,331,739 B1 * | 12/2012 | Abdulkader | G06K 9/033 358/1.11 |
| 2002/0156816 A1 * | 10/2002 | Kantrowitz | G06F 17/273 715/256 |
| 2006/0285746 A1 * | 12/2006 | Yacoub | G06K 9/03 382/176 |
| 2011/0096983 A1 * | 4/2011 | Jensen | G06K 9/033 382/161 |

OTHER PUBLICATIONS

N.V., et al., "Recognition of Books by Verification and Retraining", Center for Visual Information Technology, 2006, 4 pages.
Rawat, et al., "A Semi-Automatic Adaptive OCR for Digital Libraries", Center for Visual Information Technology, 2006, 12 pages.

* cited by examiner

*Primary Examiner* — Sumati Lefkowitz
*Assistant Examiner* — Ryan P Potts
(74) *Attorney, Agent, or Firm* — LeighAnn Weiland; Veronica Weinstein

(57) ABSTRACT

Methods and systems for performing character recognition of a document image include analyzing verification performed by a user on a recognized text obtained by character recognition of a document image, identifying analogous changes of a first incorrect character for a first correct character, and prompting the user to initiate a training of a recognition pattern based on the identified analogous changes.

19 Claims, 6 Drawing Sheets

METHOD OF IDENTIFYING PATTERN TRAINING NEED DURING VERIFICATION OF RECOGNIZED TEXT

CROSS REFERENCE TO RELATED APPLICATIONS

This application claims the benefit of priority under 35 USC 119 to Russian Patent Application No. 2014101663, filed Jan. 21, 2014; the disclosure of which is incorporated herein by reference.

BACKGROUND OF THE INVENTION

Field of the Invention

The present invention relates to the field of image processing, specifically to image processing using optical character recognition (OCR) technology.

Description of the Related Art

Optical Character Recognition (OCR) is the electronic conversion of scanned or photographed images or typewritten or printed text into machine-encoded computer-readable text. Modern optical character recognition technologies actively use training as part of the recognition process. During OCR a recognition pattern is created and then the training process is utilized to perfect the result. Recognition with training is often used when the text being processed contains decorative or special fonts or special symbols such as mathematical symbols and characters from a rare alphabet. The training process includes creation of user patterns by the system. As part of the pattern creating process, the images of characters (graphemes) that need to be paired with recognized characters are identified and presented to a user, and the user is asked to assign characters to the presented images. The images of characters (graphemes) are usually derived from a part of the document used for training patterns. The training results in a set of patterns for the images of characters (graphemes) that were encountered in the training document. The set of patterns thus created is subsequently used during recognition of the main part of the document.

Document verification is also often used as part of character recognition process. Verification improves quality of the character recognition by allowing the system to correct recognition inaccuracies.

SUMMARY OF THE DESCRIBED EMBODIMENTS

Frequently, during document verification users encounter a series of analogous mistakes, requiring multiple changes in recognition results for the same image of character (graphemes). Also, in special verification tools the user often encounters a problem with the system repeatedly asking him for the same-type confirmations of characters that have been recognized with low confidence level (rating).
This situation usually arises when the system does not have a pattern for this particular image of character (grapheme). In such cases the user is compelled to manually change the incorrectly recognized character with an appropriate correct character or confirm an uncertain recognized character. This process may take a long time, especially if the number of recognized pages is large.

Such deficiency of the pattern used to recognize the image of character (grapheme) can usually be compensated by performing additional pattern training as part of the verification process. The ability to train a pattern is often built into the recognition system (OCR engine). However, the user may not know about the engine's ability to train a pattern or may not know how to utilize this feature. In view of this, automatically showing the user when there is a need for pattern training can be highly beneficial during the verification process, increasing the overall recognition accuracy.

The proposed method automates the task of recognizing when during the verification process it becomes necessary to train the utilized pattern. Also, the method allows the users to get acquainted with pattern training for document recognition, which will increase overall recognition accuracy.

In this regard, methods, techniques, and systems are provided for analyzing verification performed by a user on a recognized text obtained by character recognition of a document image, identifying analogous changes of a first incorrect character for a first correct character, and initiating a training of a recognition pattern based on the identified analogous changes. The verification comprises changing an incorrect character identified by the user with a correct character identified by the user, and the recognition pattern is a pattern used in character recognition of the document image to generate the recognized text.

In some implementations identifying analogous changes includes tracking a number of analogous changes of the first incorrect character for the first correct character during the verification, and determining that the number of analogous changes of the first incorrect character for the first correct character reached a predetermined threshold, where the initiating of the training of the recognition pattern is based the determining that the number of analogous changes reached the predetermined threshold. In some implementations the initiating the training of the recognition pattern includes presenting the user with an option to initiate the training. In other implementations the initiating the training of the recognition pattern is automatic. In some implementations the system also performs repeating character recognition of the document image based on the trained recognition pattern, or of an unverified portion of the document image.

BRIEF DESCRIPTION OF THE DRAWINGS

Additional purposes, characteristics, and advantages of this invention will be disclosed in the following description of the embodiment of the invention with reference to the attached drawings, in which.

DETAILED DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one implementation" or "an implementation" means that a particular feature, structure, or characteristic described in connection with the implementation is included in at least one implementation of the invention. The appearances of the phrase "in one implementation" in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not other implementations.

Figure 1:
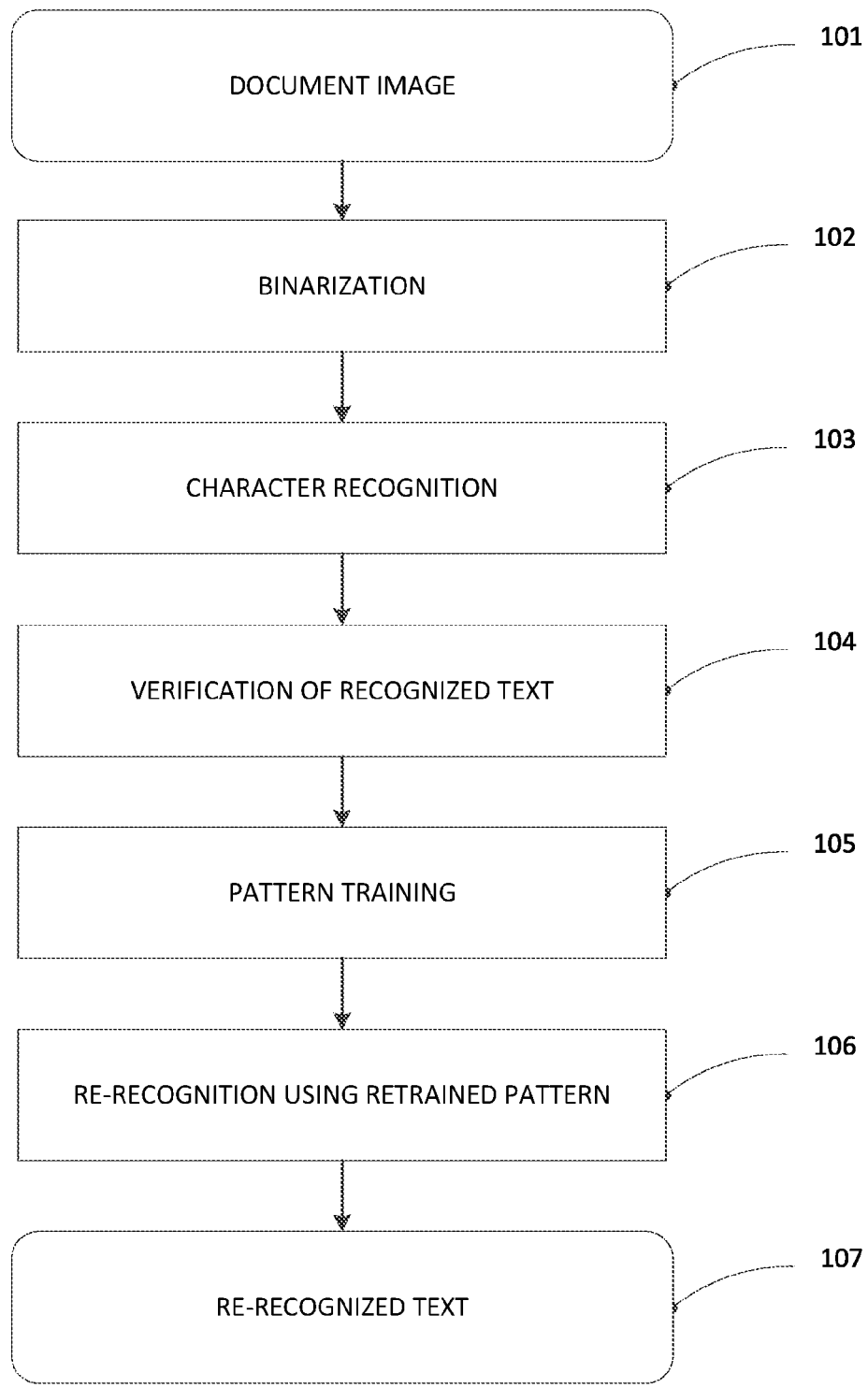
FIG. 1 shows a block diagram illustrating process of document image recognition with verification and pattern training.

FIG. 1 illustrates a method of image processing in accordance with aspects of the present invention. In some implementations, the system of the present invention receives a digital document image 101 that needs to be recognized, i.e. converted to computer-readable text. A document image is usually a photograph, a scanned document, or another type of an image containing typewritten or printed text.

In some embodiments, the system performs binarization 102 of the document image 101 converting it to a binary image. A binary image is a digital image in which each pixel has only two possible values for each pixel, such as black and white. In other words, the system converts the document image 101 from a color or grayscale image into a black-and-white representation.

In some embodiments, the document image 101 being binarized is a grayscale image. Pixels in a grayscale image can have different levels of intensity or luminance from black to white. In order to binarize a grayscale image, the system establishes a threshold binarization value. All pixels with a luminance level above the threshold are assigned color white. All pixels with luminance equal to or below the threshold are assigned color black.

In some embodiments, the system uses adaptive binarization for binarization 102 of the document image 101. The adaptive binarization allows the system to adaptively select optimal binarization parameters for different sections of the document image 101, thereby increasing quality of the binary image. In some implementations, the system uses binarization method described in U.S. Pat. No. 8,089,945 "METHOD AND SYSTEM FOR BINARIZING AN IMAGE" or U.S. Patent Application Publication No. 2012-0087587 "BINARIZING AN IMAGE," which are hereby incorporated by reference in their entirety.

In some implementations, the system performs optical character recognition (OCR) 103 of the document image 101 after it has been binarized 102. The character recognition 103 may be performed with one of the well-known methods using an optical character recognition (OCR) engine.

Optical character recognition (OCR) systems are used to transform images or representations of paper documents, such as documents in the Portable Document Format (PDF), into computer-readable, editable, and searchable electronic files. A typical OCR system includes an imaging device to produce a digital image of a document and a software component that runs on a computer and processes the images. Usually, this software includes an OCR module, which recognizes letters, characters, digits, and other symbols and converts them into a computer-readable format.

Sometimes the quality of the document image 101 is not sufficient to ensure reliable character recognition. For example, the document image 101 may contain such defects or distortions as blurring, excessive noise, being out of focus, etc. Such defects compromise reliability of recognition results. Various techniques can be applied to the document 101 to reconstruct the distorted image. For example, algorithms may be applied to correct geometric distortions. In some implementations of the invention, the document image 101 is processed with defect-correction methods to identify and remove such defects as blurriness, being out-of-focus, or excessive noise. Some of the defect-correction methods are described in U.S. Patent Application Publication No. 2012-0243792 "Detecting and Correcting Blur and Defocusing," which is hereby incorporated by reference in its entirety.

After the system processes the document image 101 by OCR 103 and generates a recognized text, verification 104 of the recognized text is performed. In some implementations the verification 104 is semi-automatic, i.e. it is performed with user participation. During the verification process 104 the user checks the recognized text for errors and manually processes identified errors. In some implementations, the processing includes making corrections to the recognized text, substituting an incorrectly recognized character with a "correct" character. In some implementations, the verification 104 may be implemented as a verification dialog window. In other implementations, the verification 104 is performed in a built-in text editor or is integrated with the OCR system.

Figure 2:
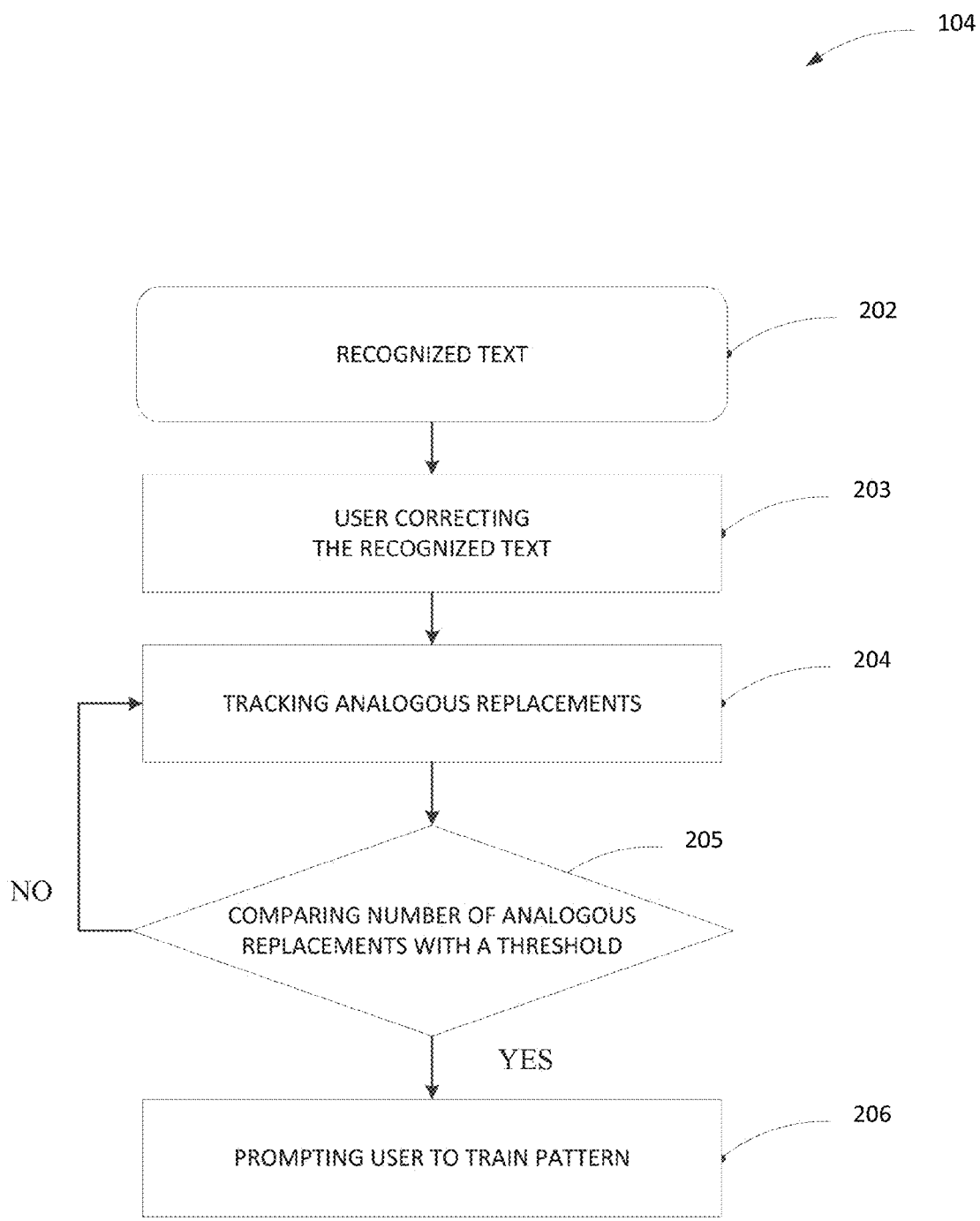
FIG. 2 shows a block diagram illustrating process of recognized text verification.

FIG. 2 illustrates the method of identifying the need for pattern training, in accordance with some aspects of the present invention. According to one of the invention's implementations, when verification 104 starts, the system begins to check whether there is a need to present the user with an option of training the recognition pattern.

When the user performs verification of recognized text 202, he makes corrections to the text 203, such as correcting inaccuracies in the recognized text, adding text that was not recognized, deleting extra characters, correcting placement of recognized characters, etc. In some implementations, this part of the verification 104 is performed using specialized verification tools as well as a text editor built into an OCR system's interface.

During user verification of the recognition results, the system automatically tracks 204 analogous changes the user makes. Two changes are analogous if they both change the same incorrectly recognized (further, just "incorrect character") character with the same correct character. In other words, each analogous change is associated with a pair of characters: an incorrectly recognized character being changed and a correct character to which the incorrectly recognized character is changed.

In some implementations, the system tracks analogous changes by maintaining a pool of changes. The pool consists of pairs of incorrectly recognized characters and correct characters that have been changed during verification 104 of the recognized text 202. Each pair of incorrectly recognized/correct characters in this pool is associated with a counter.

When a new correction is made, the system identifies the incorrectly recognized character and the correct character for the new correction and compares this pair of characters with the pairs of characters already in the pool from previous corrections of the recognized text 202. If this pair does not match any existing pair from the pool, it is added to the pool of corrections, the system established a counter for this new pair, and sets it at 1. If this pair matches one of the existing pairs in the pool, the counter for the existing pair is increased by 1. In addition to tracking analogous changes, the system also saves in memory graphemes of the incorrectly recognized characters that were corrected by the user. A grapheme is an image of a character in a document image. The grapheme being saved for the incorrectly recognized character shows how this character is presented in the document image 101.

In some implementations the tracking 204 of analogous changes is performed in parallel with the verification process 104. In other implementations the tracking is performed after verification of the recognized text or a portion of the recognized text is finished. Such tracking is performed by analyzing correction records and calculating statistics of performed corrections.

Each time the user makes an analogous change, the counter for this change is compared with a threshold value 205. In some implementations, the threshold value is specified in advance. In other implementations, the threshold value is selected during the training process.

In some implementations, during the verification process 104, when the system determines that one of the counters, associated with pairs of characters for analogous changes, reaches or exceeds the threshold value, the system prompts 206 the user to train the pattern used to perform recognition of the text.

In other implementations, the system tracks the number of counters for analogous changes that have reached or exceeded the threshold value, and the training prompt 206 is triggered only when a predetermined number of counters reaches or exceeds the threshold.

In some implementations, training a new pattern starts automatically when the threshold is reached. In these cases, no training prompt 206 to the user is needed.

In addition to same-type changes, the system also tracks user confirmations of characters that were recognized with low confidence rating. In some implementations, characters recognized with low confidence rating are marked in the text. If the user does not correct the character that was recognized with low confidence rating, the system interprets it as the user confirming the recognition result. When the system registers such confirmation of the recognition result, the confidence rating of the same remaining unverified characters increases. Subsequently, when the recognition confidence score of the character is high enough, further unverified characters are no longer marked as characters with low confidence rating. This eliminates the need to re-verify them on the following pages of the document.

Training a Pattern

Figure 3:
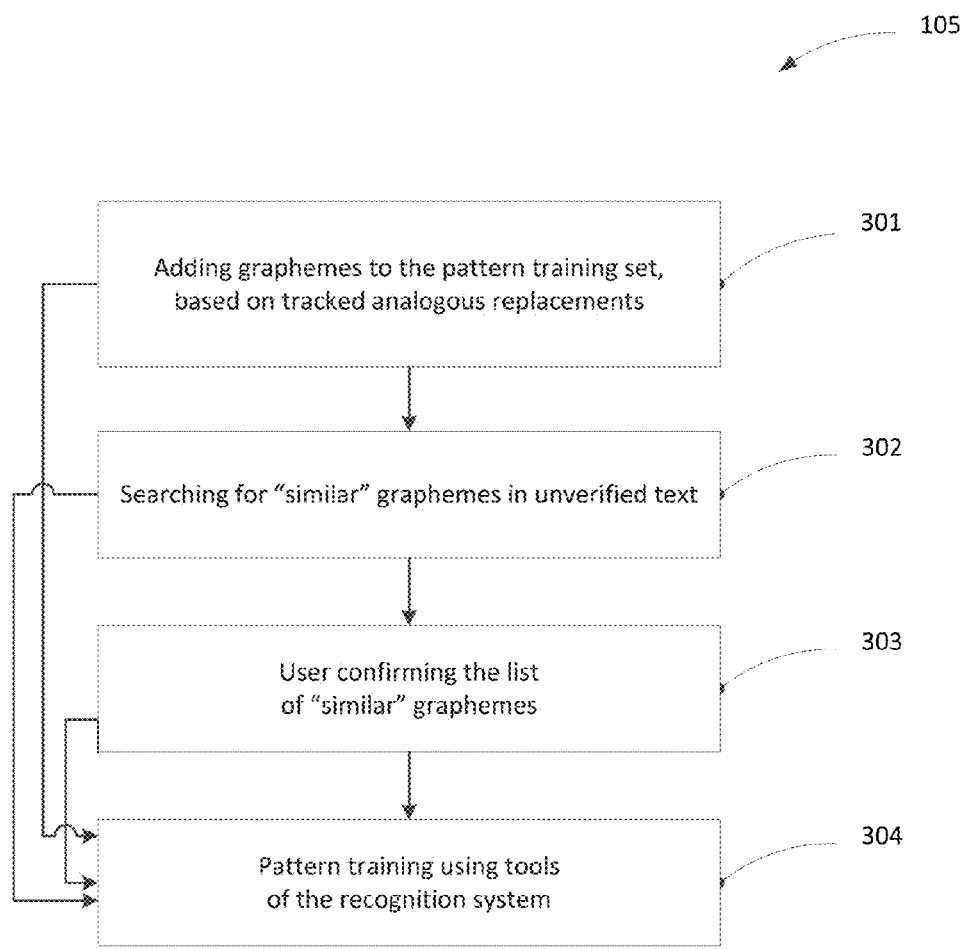
FIG. 3 shows a block diagram illustrating process of pattern training

A method of training a pattern in accordance with some implementations of the present invention is illustrated in FIG. 3.

In some implementations, when the system recognizes that the number of analogous changes has exceeded a threshold value 205 and prompts 206 the user to perform pattern training, the user is given an opportunity to initiate the pattern training process. At that time, the user can be presented with the corrections he made during the verification process 104 and can confirm these corrections. For example, the user can be prompted to confirm all or some of the changes of the character "c" to the character "o" that he performed.

The purpose of this step is to ensure that only representative character images end up in the set of graphemes intended for training a pattern, rather than printing defects, smudges, or other irrelevant changes to the recognized text. Also, this step serves as an additional confirmation that the corrected characters have been verified properly.

In some implementations, the characters waiting for confirmation are presented to the user in the text using one of the interface's available tools, such as a dialog window. The dialog window simultaneously displays a grapheme and a recognized character corresponding to the grapheme. The user is given an option of confirming that the displayed grapheme should be recognized as the correct character for the grapheme or discarding the proposed grapheme from the proposed changes to the recognition pattern.

As a result, only the graphemes of those characters that have been confirmed by the user end up in the set of graphemes to be used to train the recognition pattern. After the user has confirmed the graphemes of the verified characters, these graphemes are added to the set of images to be used for training a pattern 301.

In some implementations, the user can skip a step of confirming the graphemes to be added to the pattern training set.

In some implementations, after a set of graphemes for the training of the pattern has been formed, the system performs a search for similar graphemes 302 in the part of the document that the user has not verified. As a result of the search for similar graphemes 302, the system identifies images of characters that are most likely to also be recognized as characters which recently have been corrected by the user. The system does this by searching the source image that corresponds to the unverified section of the text for those images of characters that are "similar" to the graphemes of the characters that have been corrected by the user. The found "similar" graphemes are suggested for training the pattern.

In some implementations, "similar" graphemes are found by comparing sets of recognition hypotheses for the grapheme of a character that has been "corrected" by the user with the sets of recognition hypotheses for grapheme in the unverified part of the document. If an overlap between the sets of the recognition hypotheses exceeds a preset threshold, then the graphemes are considered "similar."

In other implementations the "similar" graphemes are found by comparison of the patterns that were used to recognize these graphemes in step 103 (FIG. 1). It is well known that, in addition to patterns, clusters are used in the recognition process 103. A cluster is an attribute of a classifier used to perform character recognition 103.

For example, for the pattern for letter "a" there are several clusters for the various typesets that can be used for this character. Specifically, there is a cluster for recognizing character "a" and there is a cluster for recognizing character "a". Graphemes are considered to be similar if during recognition process they are placed into the same or mostly the same clusters. The confidence ratings of the recognition hypotheses will also be similar in this case.

In some implementations, various metrics are used to increase reliability of the search for "similar" graphemes in the image. In some implementations, these metrics include mean squared error (MSE), mean absolute error (MAE), Hausdorff, and so forth.

In other implementations, a correlation between the two images, also called a Hausdorff distance, is used to increase reliability of the search for "similar" graphemes. This invention is not limited to the metrics listed above.

In some implementations, both the Hausdorff distance measure and the MAE measure are used to identify "similar" images at different stages of the identification process. First, during the fast stage a rough estimate of similarity is calculated by using MAE or MSE metrics to determine the class of the image, and then there during the second stage, class members are specified by calculating Hausdorff distance.

In other implementations, a training cache is used to search the source image for graphemes similar to the graphemes of characters that have been corrected by the user. The training process handles each new image as follows. First, the system attempts to find a suitable pattern for the grapheme in the cache. If a pattern is found, then it is further trained based on the new image. If the pattern is not found or the overlay is incomplete, a new pattern is created based on the new image of a character.

In some implementations the search for "similar" graphemes is performed using automatically-created patterns that are based on only the user-verified section of the document image. A recognition pattern is created based on the graphemes of the correct characters in the analogous changes, which in turn are used to search for similar graphemes in the remaining unverified part of the document image. In other words, the resulting pattern is used to initiate grapheme recognition in the remaining unverified part of the document image. In some implementations, the results of this recognition are displayed to the user. If the user is satisfied with the results of this preliminary recognition for the purpose of finding similar graphemes, then the graphemes of these characters are "similar" graphemes and therefore can be added to the training set.

Returning to FIG. 3, in some implementations, after the system conducted the search for "similar" graphemes in unverified text, the user is given an opportunity to confirm the list of "similar" graphemes 303. The user is presented with the list of the found graphemes and prompted to choose from that list the graphemes that actually correspond to the characters corrected by the user. In other words, the user is prompted to establish a mapping between the "similar" graphemes found and the characters that user corrected. For example, the user can manually indicate which character corresponds to each of the similar graphemes found. In some implementations this step is skipped.

Next, based on the set of graphemes, the system creates a pattern using its recognition tools 304. The set of graphemes to be used for pattern training contains one or more graphemes.

In some implementations, training a pattern involves creating user patterns. These patterns are created during the training process when the user enters a character combination that does not match any of the standard graphemes. A user pattern is a bit-map image that is saved after training process is finished.

Figure 4:
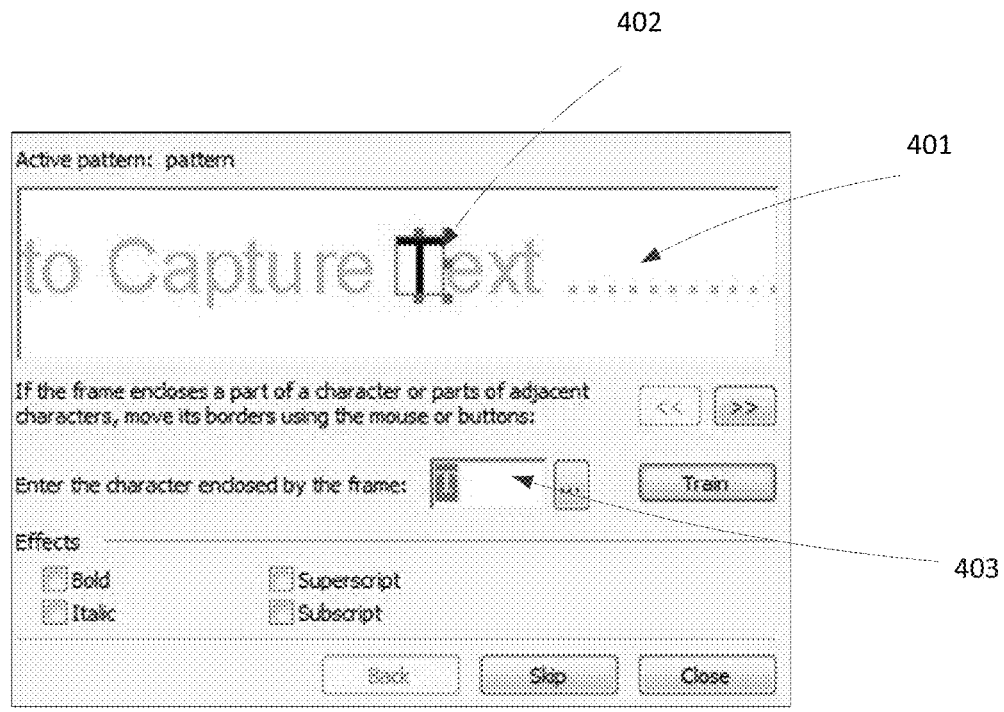
FIG. 4 shows an exemplary pattern training interface.

FIG. 4 shows an interface for a system tool used to create user pattern in some implementations of the present invention. The section of the line 401 from the document image is displayed during creation of the user pattern. The user has an option of moving the borders of the image 402 based on the segmentation options and manually enter corresponding character or ligature in a character window 403.

After the user enters the character or ligature, the system checks whether this character or ligature corresponds to any previously determined grapheme. If no preexisting grapheme is found, then a user pattern is created.

In some implementations, the user patterns created are saved only locally to be used to recognize the current document. In other implementations, these patterns are saved in a library for subsequent use when recognizing other documents. Creating and saving user patterns is especially helpful during recognition of documents with the same subject matter, such as documents containing mathematical symbols, etc.

Returning to FIG. 1, after the system finished pattern training 105, it performs re-recognition of the document image 106 using re-trained pattern producing re-recognized text 107. In some implementations, the re-recognition is performed only on the portion of the document image that has not yet been verified by the user. In other implementations, the system also performs re-recognition of already verified portion of the document image. If such re-recognition of the verified document image is performed, it is important not to lose the user corrections that were introduced earlier during verification.

In some implementations, the re-recognition 106 is performed in the background, i.e. automatically, without an explicit user command. Such background recognition does not block the interface and can be performed at the same time as the user continues the verification process. In some implementations, the background re-recognition appears to the user as uninterrupted verification during which he is periodically prompted to train a pattern and confirm groups of characters used to train a new pattern. No time is spent waiting for the recognition process to finish. In some implementations the re-recognition 106 is performed explicitly, i.e. with user involvement.

In some implementations the re-recognition 106 is performed on individual graphemes that meet the "similarity" criteria, in other implementations, on words containing these characters. Re-recognition of words containing "similar" graphemes presents the opportunity for lexical verification of the results. Lexical verification significantly increases recognition accuracy. Moreover, in some implementations the re-recognition 106 is performed on individual paragraphs containing "similar" graphemes. This makes it possible to additionally perform contextual verification of the recognized text, which increases recognition accuracy.

The described invention can be used to train patterns during recognition of CJK languages (Chinese, Japanese, Korean). In such implementation, a source CJK document is recognized in step 103 by one of the known methods. For example, an appropriate method to recognize document images in CJK languages is described in detail in U.S. Patent Application Publication No. 2013-0286030 "Fast CJK Character Recognition" which is hereby incorporated by reference in its entirety.

Figure 5:
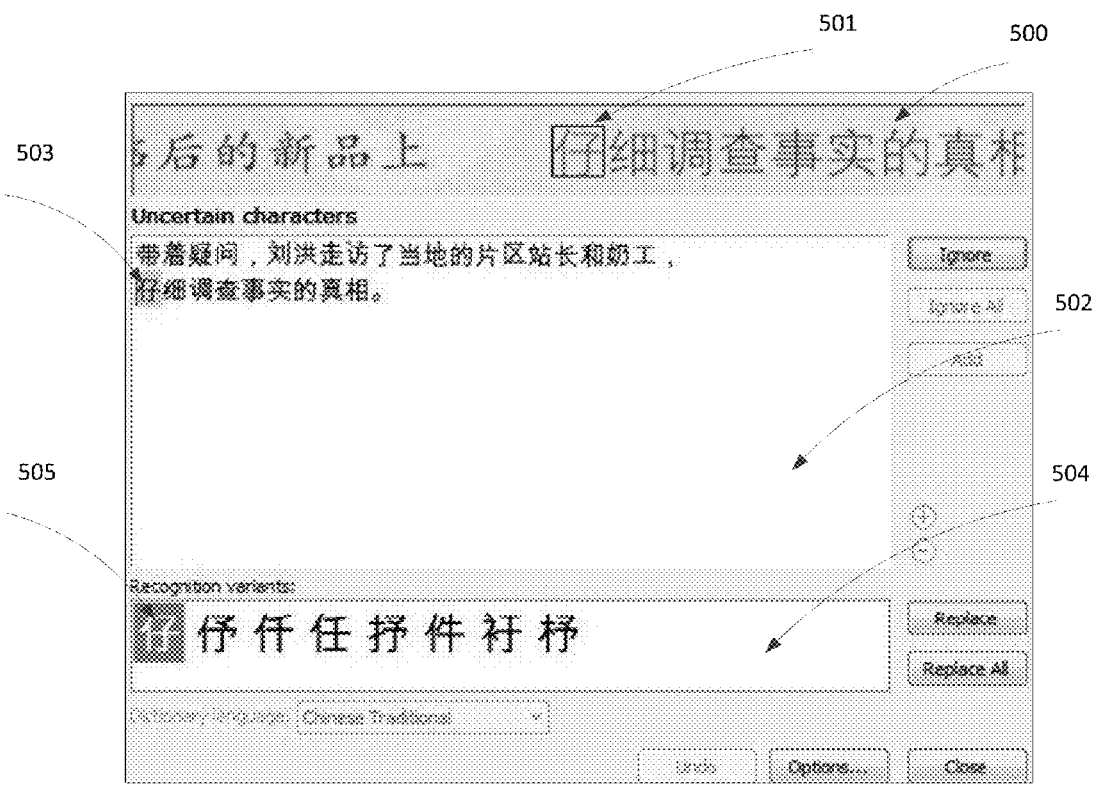
FIG. 5 shows an exemplary pattern training interface for Chinese, Japanese, Korean (CJK) characters.

During verification 104 of recognition results for CJK languages, the user is provided with a special tool for correcting CJK characters. FIG. 5 gives an example of an interface for verifying recognized text in CJK languages. The document image in Chinese is shown in window 500. The recognition results are displayed in window 502. Window 504 is a specialized tool that, during verification, gives the user a list of graphemes that are similar to an image corresponding to the highlighted CJK character 501. As can be seen, the highlighted CJK character 501 has been recognized with low confidence level. When the mouse is hovered over the recognition result 503 for the CJK character 501, several recognition alternatives for the CJK character 501 are displayed in the window 504 containing recognition alternatives. The user may manually select a correct recognition result to insert it into the text in place of the incorrectly recognition character. This tool is useful when entering CJK characters with a keyboard is inconvenient or impossible.

In some implementations, the pattern is then trained automatically based on the user's selection of the desired recognition result from the list of suggested graphemes (in window 505). This training is performed by storing images of user-corrected CJK characters, e.g. as in 501, and their corresponding user-specified CJK character (505). The exact representation of the source CJK character is known, because the character segmentation method is highly reliable.

In some implementations, the character segmentation for CJK languages is performed by constructing a Graph of Linear Division (LDG) for CJK languages. One of method of segmenting a line of CJK characters is described in U.S. Pat. No. 8,559,718 "Defining a Layout of Text Lines of CJK and non-CJK Characters" which is hereby incorporated by reference in its entirety.

In another implementation, if a sufficiently large number (above a predefined threshold value) of corrections were made during the verification process, the user is prompted to further train the pattern for the CJK character directly on the images that were used to change the incorrectly recognized CJK characters. Rather than accumulating statistics on the changes of one character by another, the images that required correction are clustered and the decision whether to further train a pattern and what to use in that training is made on the basis of this clustering.

Figure 6:
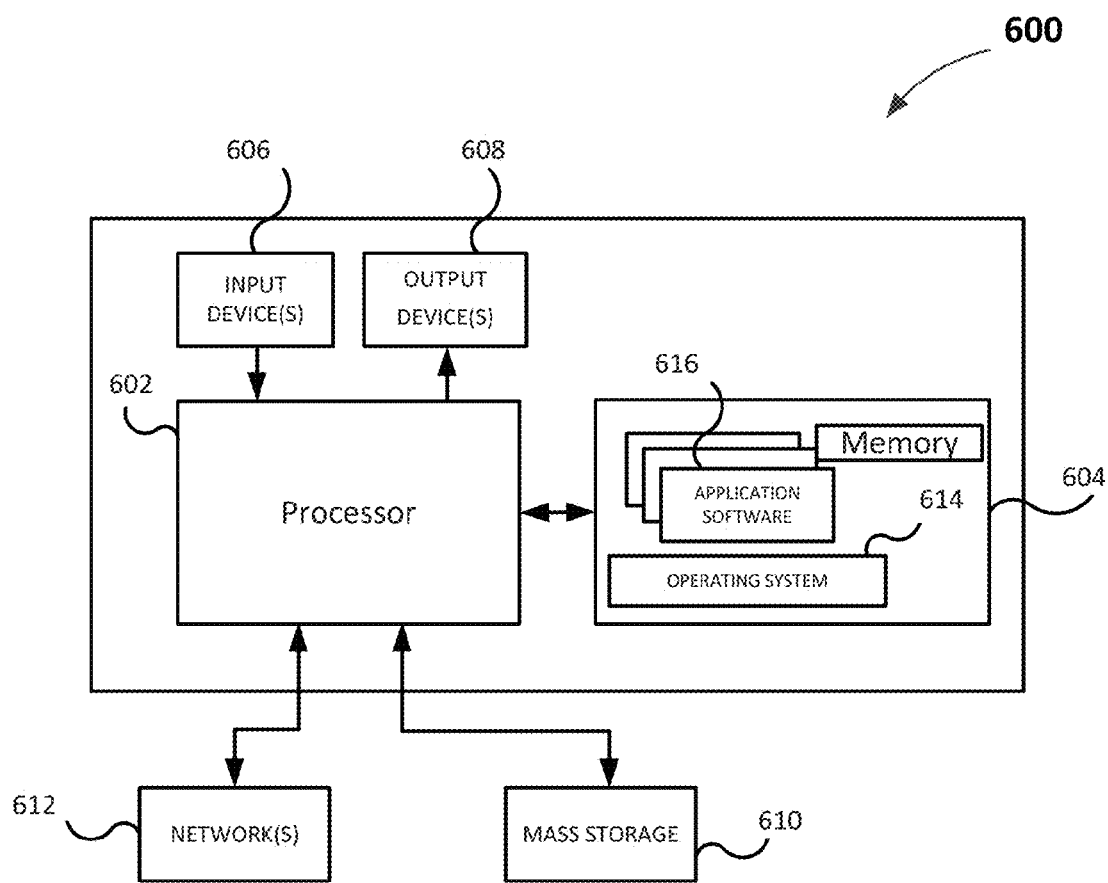
FIG. 6 shows an exemplary computer system that can be used to implement the present invention.

FIG. 6 illustrates an exemplary computer system 600 that in some implementations is used with the present invention, as described above. The system 600 includes one or more processors 602 connected to a memory 604. The processor(s) 602 may contain one or more computer cores or may be a chip or other device capable of performing computations (for example, a Laplace operator may be produced optically). The memory 604 may be random access memory (RAM) and may also contain any other types or kinds of memory, particularly non-volatile memory devices (such as flash drives) or permanent storage devices such as hard drives, etc. In addition, an arrangement can be considered in which the memory 604 includes remotely located information-storage media, as well as local memory such as cache memory in the processor(s) 602, used as virtual memory and stored on an external or internal permanent memory device 610.

The computer system 600 also usually includes input and output ports to transfer information out and receive information. For interaction with a user, the computer system 600 may contain one or more input devices 606 (such as a keyboard, a mouse, a scanner, or other) and output devices 608 (such as displays or special indicators), The computer system 600 may also have one or more permanent storage devices 610 such as an optical disk drive (CD, DVD, or other), a hard disk, or a tape drive. In addition, the computer system 600 may have an interface with one or more networks 612 that provide connection with other networks and computer equipment. In particular, this may be a local area network (LAN) or a WI-FI network, and may or may not be connected to the World Wide Web (Internet). It is understood that the computer system 600 may include analog and/or digital interfaces between the processor 602 and each of the components 604, 606, 608, 610 and 612.

The computer system 600 is managed by an operating system 614 and includes various applications, components, programs, objects, modules and other, designated by the consolidated number 616.

The programs used to accomplish the methods corresponding to this invention may be a part of an operating system or may be a specialized peripheral, component, program, dynamic library, module, script, or a combination thereof.

This description shows the basic inventive concept of the inventors, which cannot be limited by the hardware mentioned earlier. It should be noted that hardware is primarily intended to solve a narrow problem. As time goes by and as technology develops, such a task becomes more complex or it evolves. New tools arise that are capable of meeting new demands. In this sense, it is appropriate to look at this hardware from the point of view of the class of technical tasks they solve, not simply as a technical implementation on some elementary framework.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The invention claimed is:

1. A computer-implemented method for text analysis, comprising:
   analyzing verification performed by a user on a recognized text obtained by character recognition of a document image,
      wherein the verification comprises changing an incorrect character identified by the user for a correct character identified by the user;
   identifying analogous changes of a first incorrect character for a first correct character; and
   initiating a training of a recognition pattern based on the identified analogous changes,
      wherein the recognition pattern is a pattern used in character recognition of the document image to generate the recognized text.

2. The computer-implemented method of claim 1, wherein:
   the identifying analogous changes comprises
   tracking a number of analogous changes of the first incorrect character for the first correct character during the verification, and
   determining that the number of analogous changes of the first incorrect character for the first correct character has reached a predetermined threshold, and
   the initiating of the training of the recognition pattern is based on the determining that the number of analogous changes has reached the predetermined threshold.

3. The computer-implemented method of claim 1, wherein the initiating the training of the recognition pattern comprises presenting the user with an option to initiate the training.

4. The computer-implemented method of claim 1, wherein the initiating the training of the recognition pattern is automatic.

5. The computer-implemented method of claim 1, further comprising
   repeating character recognition of the document image based on the trained recognition pattern.

6. The computer-implemented method of claim 1, further comprising
   repeating character recognition of an unverified portion of the document image based on the trained recognition pattern.

7. The method of claim 1, wherein identifying analogous changes of a first incorrect character for a first correct character comprises automatically tracking analogous changes during verification of recognition results.

8. Computer storage media encoded with one or more computer programs, the one or more computer programs comprising instructions that when executed by a data processing apparatus cause the data processing apparatus to perform operations comprising:
   analyzing verification performed by a user on a recognized text obtained by character recognition of a document image,
      wherein the verification comprises changing an incorrect character identified by the user for a correct character identified by the user;
   identifying analogous changes of a first incorrect character for a first correct character; and
   initiating a training of a recognition pattern based on the identified analogous changes, wherein the recognition pattern is a pattern used in character recognition of the document image to generate the recognized text.

9. The computer storage media of claim 8, wherein:
   the identifying analogous changes comprises
   tracking a number of analogous changes of the first incorrect character for the first correct character during the verification, and
   determining that the number of analogous changes of the first incorrect character for the first correct character has reached a predetermined threshold, and
   the initiating of the training of the recognition pattern is based the determining that the number of analogous changes has reached the predetermined threshold.

10. The computer storage media of claim 8, wherein the initiating the training of the recognition pattern comprises presenting the user with an option to initiate the training.

11. The computer storage media of claim 8, wherein the initiating the training of the recognition pattern is automatic.

12. The computer storage media of claim 8, further comprising
repeating character recognition of the document image based on the trained recognition pattern.

13. The computer storage media of claim 8, further comprising
repeating character recognition of an unverified portion of the document image based on the trained recognition pattern.

14. A system, comprising:
a computing device; and
a computer-readable medium coupled to the computing device and having instructions stored thereon which, when executed by the computing device, cause the computing device to perform operations comprising:
analyzing verification performed by a user on a recognized text obtained by character recognition of a document image,
wherein the verification comprises changing an incorrect character identified by the user for a correct character identified by the user;
identifying analogous changes of a first incorrect character for a first correct character; and
initiating a training of a recognition pattern based on the identified analogous changes,
wherein the recognition pattern is a pattern used in character recognition of the document image to generate the recognized text.

15. The system of claim 14 wherein:
the identifying analogous changes comprises
tracking a number of analogous changes of the first incorrect character for the first correct character during the verification, and
determining that the number of analogous changes of the first incorrect character for the first correct character has reached a predetermined threshold, and
the initiating of the training of the recognition pattern is based the determining that the number of analogous changes has reached the predetermined threshold.

16. The system of claim 14, wherein the initiating the training of the recognition pattern comprises presenting the user with an option to initiate the training.

17. The system of claim 14, wherein the initiating the training of the recognition pattern is automatic.

18. The system of claim 14, further comprising
repeating character recognition of the document image based on the trained recognition pattern.

19. The system of claim 14, further comprising
repeating character recognition of an unverified portion of the document image based on the trained recognition pattern.

* * * * *